Figure 5:
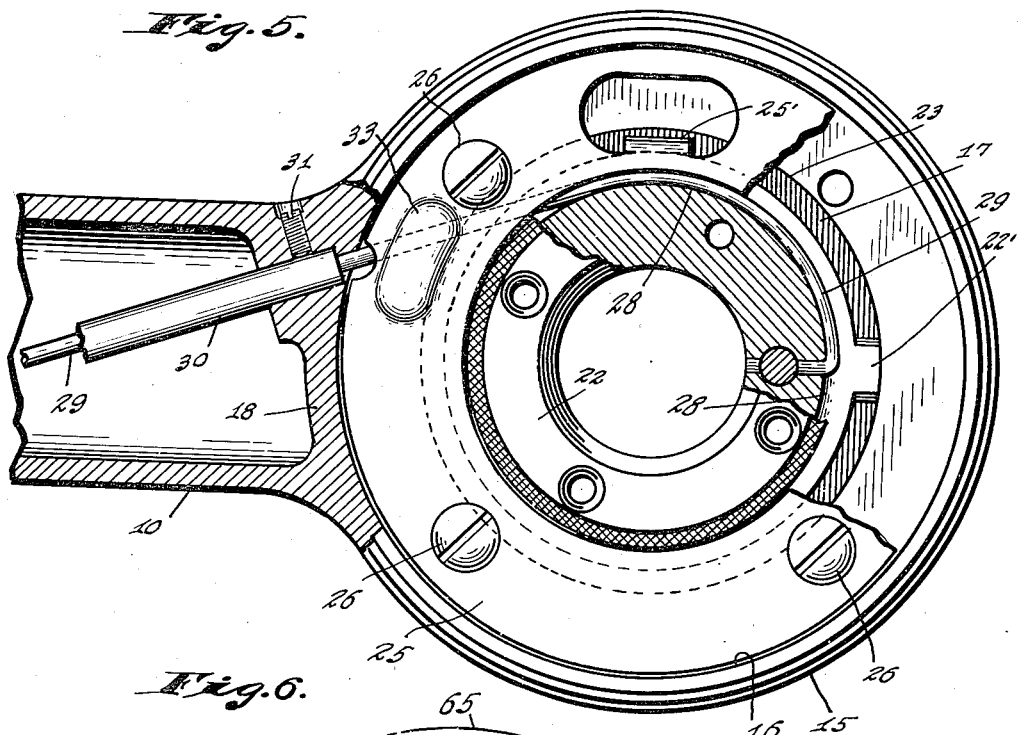

July 7, 1936.  E. C. BOOTH  2,046,605
CONTROL FOR A RADIO SET
Filed Jan. 20, 1934  5 Sheets-Sheet 1
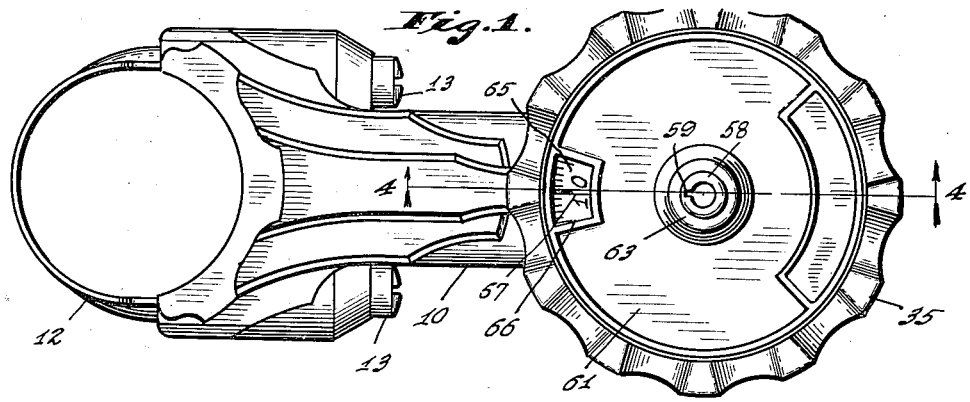
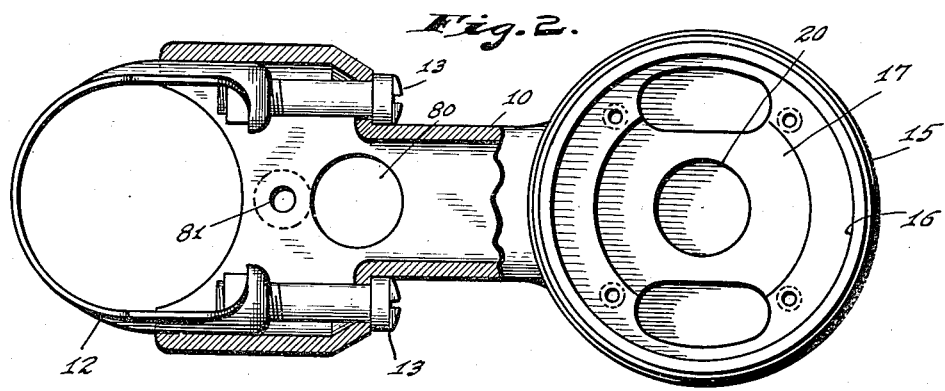
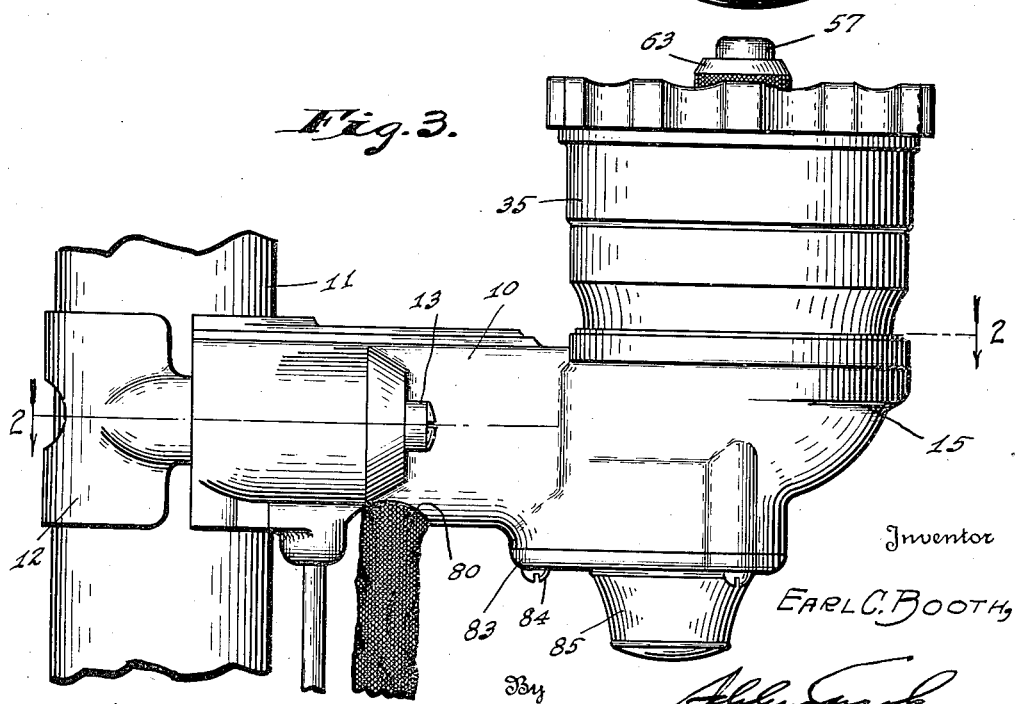
Inventor
EARL C. BOOTH,
By
Attorneys

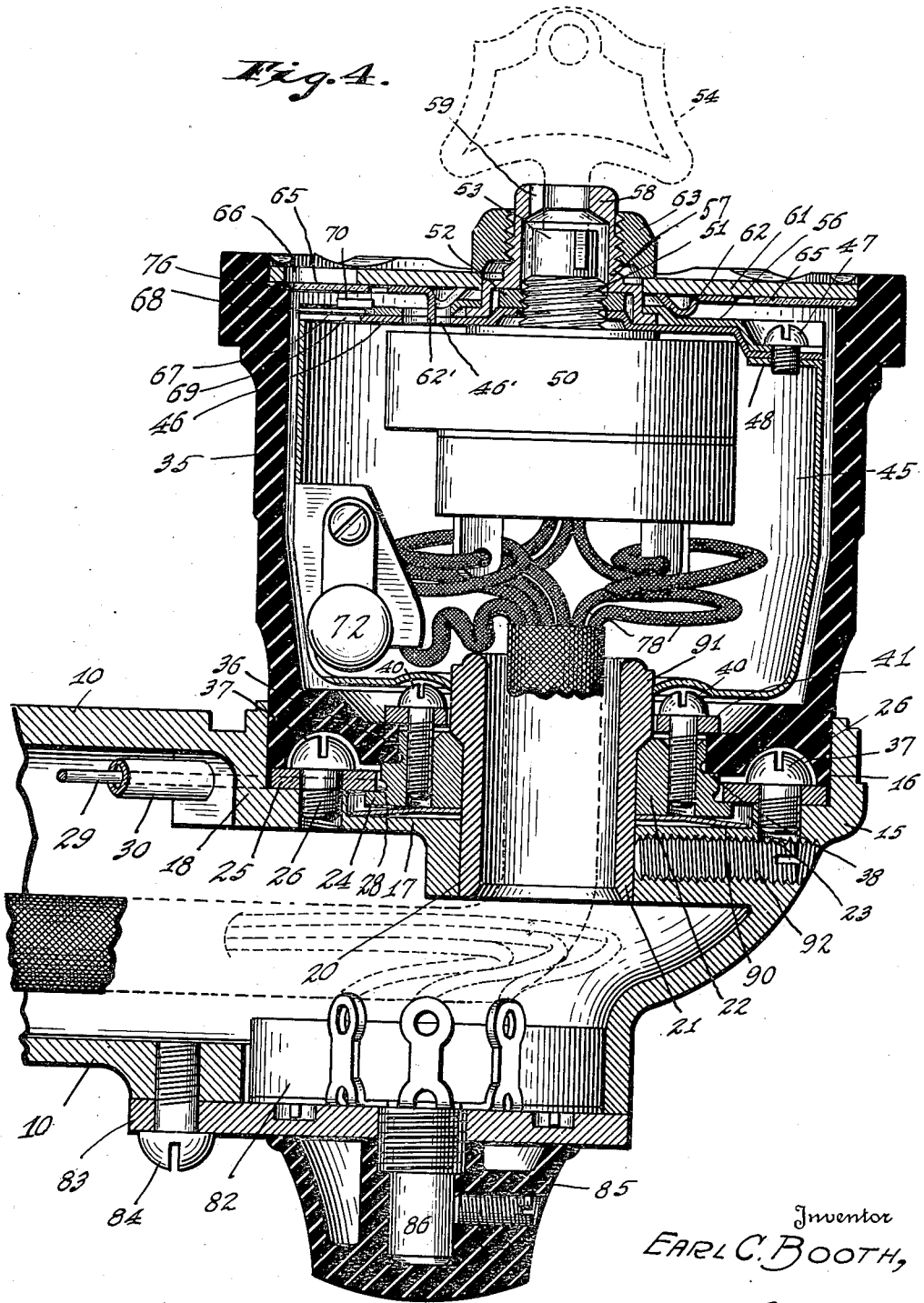

July 7, 1936.　　　　　　E. C. BOOTH　　　　　　2,046,605
CONTROL FOR A RADIO SET
Filed Jan. 20, 1934　　　　　5 Sheets-Sheet 3

Inventor
EARL C. BOOTH,
By [signature]
Attorneys

July 7, 1936.    E. C. BOOTH    2,046,605
CONTROL FOR A RADIO SET
Filed Jan. 20, 1934    5 Sheets-Sheet 5

Inventor
EARL C. BOOTH,

By
Attorneys

Patented July 7, 1936

2,046,605

UNITED STATES PATENT OFFICE 2,046,605

CONTROL FOR A RADIO SET

Earl C. Booth, Columbus, Ind., assignor to Noblitt-Sparks Industries, Inc., Columbus, Ind., a corporation of Indiana Application January 20, 1934, Serial No. 707,569

6 Claims. (Cl. 250—20)

My invention relates to control units for automobile radio sets in which it is customary to locate the control unit apart from the radio set itself. Such control units usually embody a rotatable element mechanically connected to the tuning condenser of the radio set, and one or more pieces of adjustable electrical apparatus, such as a rheostat, electrically connected to the radio set. In some cases, the pieces of adjustable apparatus are all located in close association with the radio set and mechanically connected to operating members in the control unit.

It is the object of my invention to produce a control unit for use in conjunction with an automobile radio set, which unit will be compact, attractive in appearance, and economical to manufacture. A further object of my invention is to produce a control unit which may be mounted in a variety of positions and in which the index that indicates the condition of tuning adjustment may be disposed in any desired position relative to the remainder of the control unit. A still further object of my invention is to produce a control unit in which there will be no necessity for gearing or other speed-reducing device in the tuning mechanism.

In carrying out my invention I form the base of the control unit as a hollow arm adapted to be attached to the steering-post of an automobile and to be secured in any desired position of angular adjustment about the axis of such steering-post. On the outer end of this arm, I mount a rotatable hollow knob of relatively large diameter which is adapted to be mechanically connected to the tuning condensers of the radio set so that the set may be tuned by rotation of the knob. Within the knob, and stationarily supported from the arm constituting the base of the unit, I may provide a rheostat or other adjustable apparatus adapted for the electrical control of the radio set; or, if desired, I may mount all the adjustable electrical devices in the set and mechanically connect them with control members carried from the hollow arm.

The arm also carries a support bearing an index cooperating with an annular series of graduations on the control knob, and this support is rotatable about the axis of the control knob so that such index can be disposed at any desired angular position. The control knob itself is angularly adjustable about its own axis relative to the mechanism connecting it to the tuning condensers, so that the position of the annular series of graduations it carries can be properly co-ordinated with the tuning condensers.

Figure 6:
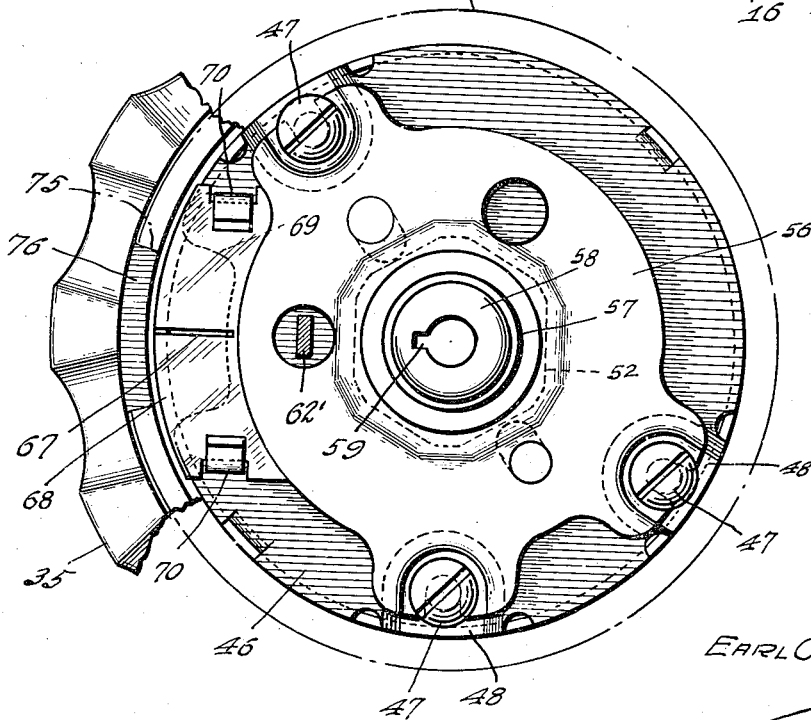
Figure 7:
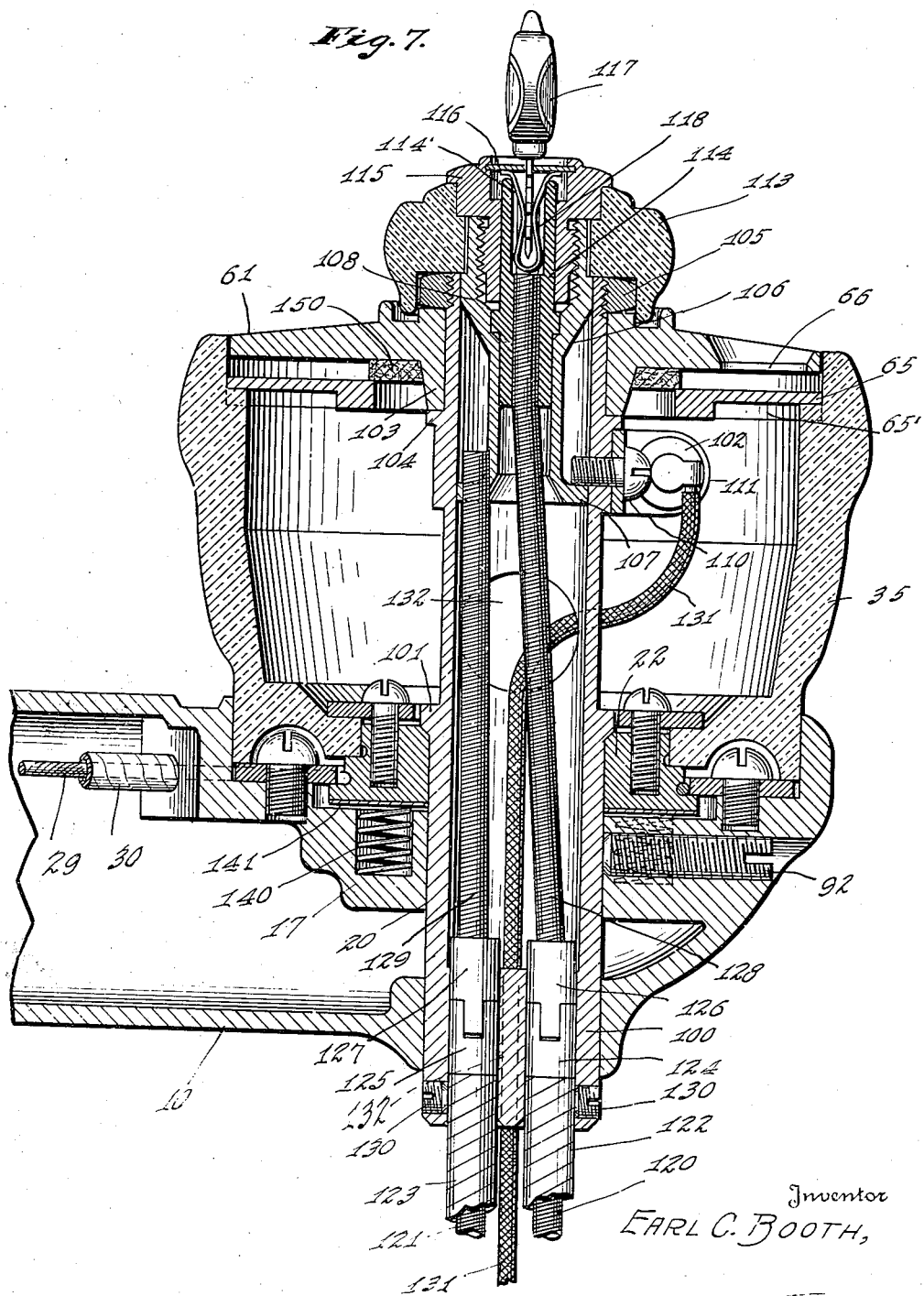
Figure 8:
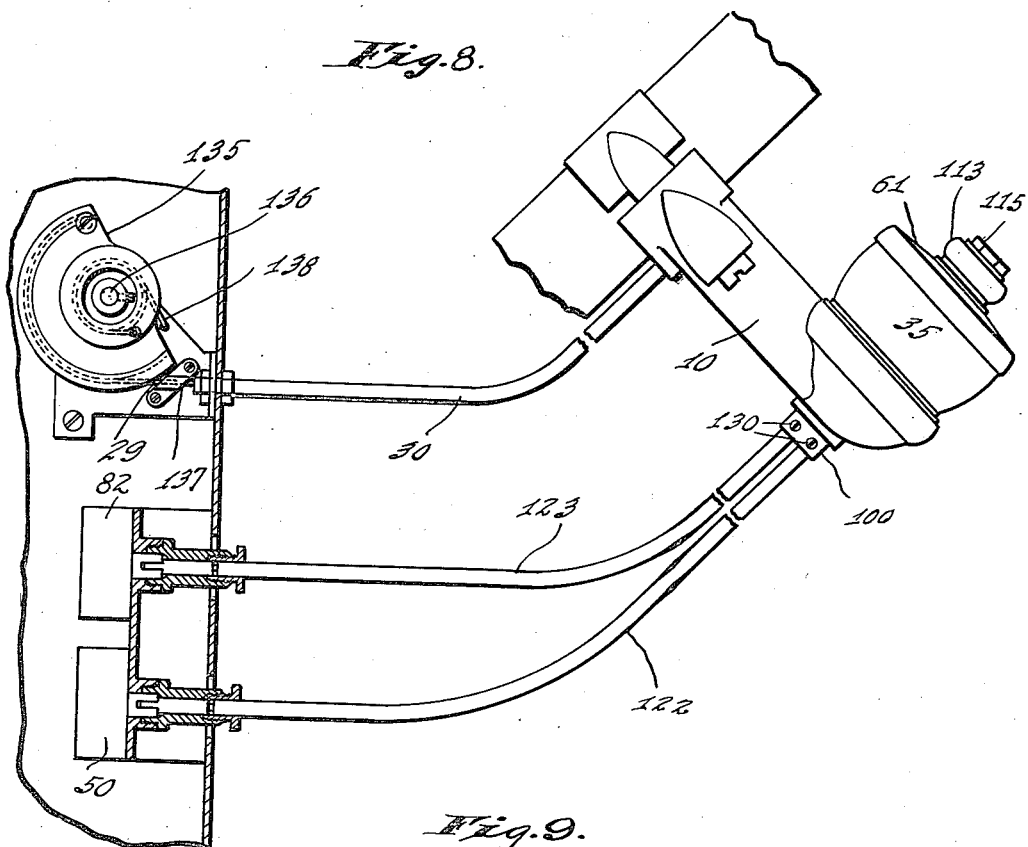
Figure 9:
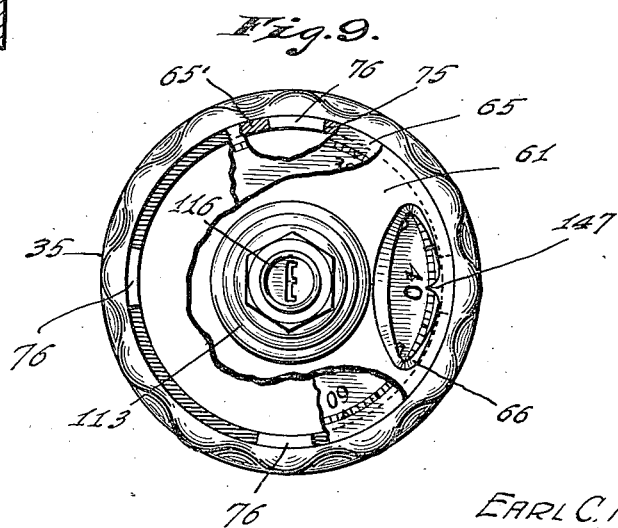

The accompanying drawings illustrate my invention: Fig. 1 is a plan view of the complete control unit; Fig. 2 is a plan of the base of the unit with a part of such base broken away on the line 2—2 of Fig. 3; Fig. 3 is a side elevation of the complete control unit; Fig. 4 is a fragmental vertical section on the line 4—4 of Fig. 1; Fig. 5 is a fragmental plan of the outer end of the base with the control knob removed, some parts being broken away for clearness of illustration; and Fig. 6 is a top plan view of the rheostat-support located within the control knob; Fig. 7 is a view similar to Fig. 4, but illustrating a modified construction; Fig. 8 is an elevation indicating the manner in which the control mechanism of Fig. 7 is operatively connected with the adjustable devices of the radio set; and Fig. 9 is a plan view of the control mechanism of Fig. 7.

The base of the control unit is formed as a hollow arm 10 which is conveniently a die-casting. The inner end of the arm 10 is shaped to conform to the curvature of an automobile steering-post 11 and has associated with it a clamp 12 adapted to be tightened as by means of a clamp screw 13. On the outer end of the arm 10 there is formed a circular enlargement 15 having in its upper face a circular depression or recess 16 separated from the remainder of the space within the arm 10 by a bottom partition 17 and a side wall 18.

In the partition 17 there is a centrally located opening 20 of a diameter to receive a bushing 21 which serves as a pivotal support for a Bowden-wire pulley 22. The pulley 22 is held in place in a circular depression 23 in the upper face of the partition 17 by being provided with an outwardly projecting annular flange received beneath a washer 25 secured to the partition 17 as by means of an annular series of screws 26. These parts are perhaps best shown in Fig. 4.

In the plane of the washer 25, the pulley 22 is provided with an annular groove 28 adapted to receive one end of a Bowden-wire 29 which extends to the radio set proper and has its end secured to a pulley on the shaft carrying the movable plates to the tuning condensers, as hereinafter described in greater detail. As it leaves the groove 28 in the pulley 22, the wire 29 passes through a groove formed in the lower surface of the washer 25 and disposed tangentially to the pulley 22. Outwardly beyond the groove 25, the wire 29 passes through an opening in the wall 18, such opening being enlarged at its rear end to receive the end of the Bowden-wire casing 30, the latter being secured to the arm 10 as by means of a set-screw 31 (Fig. 5).

It is obvious that in a Bowden-wire control of this kind it is advisable to prevent rotation of the pulley 22 in a wire-unwinding direction beyond the point where the wire-end fastened to the pulley comes into alinement with the groove through which the wire leaves the pulley. I therefore prefer to provide the pulley 22 and the washer 25 with co-operating abutments 22' and 25' respectively for limiting rotative movement of the pulley to somewhat less than a full revolution. (See Fig. 5.)

Because of the weakening effect of the Bowden-wire-receiving groove in the lower face of the washer 25, such washer may be strengthened in the vicinity of the groove by being formed with an upwardly extending boss 33 which bridges the area covered by the groove and which, for reasons that will become apparent hereinafter, lies at the same distance from the axis of the washer 25 as do the screws 26.

For the purpose of rotating the pulley 22, I provide a hollow control knob 35, conveniently of some molded insulating material. At its lower end, the knob 35 has an inwardly directed flange 36 the bottom surface of which is provided with an annular groove 37 to afford clearance for the heads of the screws 26 and for the boss 33. The inner edge of the flange 36 rests upon a shoulder 38 formed on the pulley 22 and located above the upper surface of the washer 25, as is clear from Fig. 4. The knob 35 is secured to the pulley 22 as by means of vertical screws 40 which pass through a washer 41 bearing on the upper face of the flange 36 and received in screw-threaded openings in the pulley 22. Conveniently, the upper surface of the shoulder 38 is roughened somewhat where it engages the lower surface of the flange 36, in order to prevent relative annular movement of the pulley 22 and knob 35 when the screws 40 are tightened.

It will be apparent from the construction so far described that when the knob 35 is secured to the pulley 22 by means of the washer 41 and screws 40 the knob may be turned to rotate the pulley 22, thus causing longitudinal movement of the Bowden-wire 29 in its casing 30. This movement of the Bowden-wire is transferred in any convenient manner to the adjustable tuning condensers of the radio set.

In the case of the device illustrated in Figs. 1 to 6, I contemplate that a rheostat or other electrical apparatus will be mounted within the knob 35. As a support for any such apparatus I employ a cup 45, conveniently in the form of a sheet-metal stamping, which has in its base an opening to receive the upper end of the bushing 21. The cup may be secured to the bushing, as by soldering. The upper open end of the cup 45 is closed by a cover plate 46 secured to the cup by means of screws 47 which pass through holes in the cover 46 into ears 48 formed by inwardly bent portions of the upper edge of the cup 45.

Electrical apparatus mounted within the cup 45 is shown in the drawings as comprising a combined switch and rheostat 50 which is adapted to turn the radio set on or off and to control sound volume. The unit 50 is formed with an upwardly projecting central boss 51 which is screw-threaded exteriorly and which passes through a central opening in the cover 46 to receive a nut 52 by means of which the unit 50 is clamped to the cover. The operating member of the unit 50 is in the form of a shaft 53 which projects upwardly through the boss 51 and has its upper end slotted for the reception of the lower end of a key 54.

Upon the cover 46 there is mounted a plate 56 which is conveniently held in place by the same screws 47 that retain the cover in place on the cup. The plate 56 has a central opening and is conveniently formed of sheet-metal so that the edges of such openings can be deformed upwardly to form in the lower surface of the plate 56 a polygonal recess adapted to receive the polygonal head of a fitting 57 which extends upwardly through and beyond the plate 56. The fitting 57 has an axial recess sufficiently large in diameter to receive the boss 51 and shaft 53 and is counterbored for the reception of the nut 52. At its upper end, the fitting 57 has an inwardly directed annular flange 58 slotted as at 59 to permit the passage of the tang of the key 54.

Upon the plate 56 there is supported an escutcheon plate 61 which constitutes, in effect, a closure of the open upper end of the knob 35. The escutcheon plate 61 may have secured to its lower surface a collar 62, conveniently of sheet-metal and formed to receive support from the body portion of the plate 56 beyond the central deformation therein. The escutcheon plate is held in place by a nut 63 which co-operates with screw-threads on the outer surface of the fitting 57 and is located angularly about its axis by means of an ear 62' struck from the collar 62 and receivable in a hole 46' in the cover 46. At its extreme upper end, the knob 35 is provided interiorly with an annular rabbet groove which receives the outer edge of the escutcheon plate 61.

The bottom of the rabbet groove just mentioned serves as a support for a ring 65 of celluloid or some other transparent material that bears a series of graduations by which the condition of adjustment of the radio set is indicated, such graduations, as the knob 35 is rotated, being successively exposed through an opening 66 in the escutcheon plate 61.

An index for co-operation with the graduations on the ring 65 is conveniently provided by a narrow slit 67 formed in a plate 68 of translucent material which is mounted over an opening 69 in the cover 46 of the cup 45. Conveniently, the plate 68 is held in position by being provided with notched edges, the notches of which receive ears 70 struck up from the material of the cover 46.

The opening 66 in the escutcheon plate 61 and the opening 69 in the cover 46 are disposed in alinement with each other, and directly below them I provide a small lamp bulb 72 light from which illuminates the index plate 68 and that portion of the dial 65 which is exposed through the opening 66.

The dial 65, which is indicated in chain-lines in Fig. 6, may be provided in its periphery with a notch 75 adapted to receive a boss 76 projecting upwardly from the bottom of the rabbet-groove in the upper end of the control knob 35. This arrangement insures that the dial 65 will always have the same angular position relative to the control member and, therefore, that the graduations on the dial 65 will accurately indicate the position of angular adjustment of the control member.

The lamp 72 and the terminals of the control unit 50 are connected to wires 78 constituting a cable which leads downwardly through the bushing 21, inwardly through the interior of the arm 10, and thence outwardly to the radio set through an opening 80 formed in the bottom wall of the arm 10. The Bowden-wire casing 30 also extends inwardly through the interior of the arm 10 and emerges therefrom through an opening 81, from which it extends to the radio set.

If an additional electrical control, such as a tone control, for the radio set is desired, the bottom wall of the arm 10 may be provided near its outer end with an opening for the reception of such a control. As indicated in Figs. 3 and 4, a tone-control unit 82 may be mounted upon a plate 83 secured to the lower surface of the arm 10. The tone-control unit 82 will be provided with an operating knob 85 secured to the lower end of a control shaft 86, which extends downwardly through the plate 83.

In automobile-radio sets with remote control, the Bowden-wire 29 is frequently used to rotate the tuning condensers in only one direction, such condensers being rotated in the opposite direction by means of a torsion spring. To prevent the control pulley 22 and knob 35 from rotating as the result of tension introduced into the Bowden-wire 29 by such a spring, I provide a friction brake for the control pulley 22. Conveniently, this brake is located between the lower face of the control pulley and the upper face of the partition 17, and may constitute a member 90 of some resilient sheet-metal which is deformed to bear yieldingly against the partition 17 and the bottom of the pulley 22.

To maintain the bottom of the cup 45 out of contact with the heads of the screws 40 or with the upper surface of the flange 36, the bushing 21, with which the cup 45 is rigid, may be provided with an exterior shoulder 91 which engages the upper face of the pulley 22. The bushing 21, and the cup 45 which it bears, may be prevented from either axial or angular displacement by means of a set screw 92 in the arm 10.

It will be noted that the cup 45 and the parts which it supports, such as the control unit 50 and the escutcheon plate 61, are all supported from the bushing 21 which is normally held stationary by the set screw 92. Thus, rotation of the knob 35 is effected without displacement of the cup 45 or the escutcheon plate 61. This construction enables me to use a relatively large diameter knob 35 whose angular position can be nicely adjusted by the hand of the operator and I thus eliminate the necessity for any gearing or other speed-reducing mechanism.

In installing the control unit in an automobile, the arm 10 is first clamped to the steering post 11 in any position which the user may desire. The radio set may be turned on and tuned to some broadcasting station, preferably a station broadcasting on a frequency near one end or near the middle of the broadcast band. The set may then be turned off.

The set screw 92 is now loosened, and the cup 45 and bushing 21 withdrawn from within the knob 35, thus exposing the heads of the screws 40, which are then loosened to render the knob 35 rotatable relatively to the pulley 22. While the pulley 22 is maintained stationary in the position to which it was brought during tuning operation, the knob 35, in which the dial 65 has been replaced, is then rotated relatively to the pulley 22 until that graduation of the dial 65 corresponding to the frequency to which the radio set is tuned is in the position desired by the user for the position of the index, usually at the top of the dial as the user views it. Following this the screws 40 are tightened to clamp the knob to the pulley 22. The dial 65 is then removed and the device reassembled. If desired, the user may, before tightening the screw 92, turn the set on and rotate the escutcheon plate 61 and the cup 45 about the axis of the bushing 21 to bring the index slot 67 into direct alinement with that graduation which is to indicate the frequency to which the radio set has been tuned. After the adjustment is affected, the screw 92 may be tightened.

As is customary, the slot 59 of the fitting 57 is so disposed that the key 54 can be withdrawn only when the control unit 50 has been adjusted to shut the radio set off. When it is desired to operate the set, the key 54 is inserted, the shank passing through the slot 50 in the fitting 57 and into the slotted upper end of the shaft 53. The key may then be turned to rotate the shaft thus turning the set on and initiating the supply of current to the lamp 72. Tuning is then effected by rotating the knob 35, the graduations of the dial 65 which successively appear in alinement with the index slot 66 indicating the tuning of the receiving set.

In the modification of my invention illustrated in Figs. 8 and 9, the adjustable electrical devices such as the volume-control unit 50 and the tone-control unit 82 are not supported from the arm 10, but instead are mounted in association with other electrical apparatus of the set and are mechanically connected to rotatable operating members carried by the arm 10. The mechanism for moving the Bowden-wire 29 to effect tuning adjustments of the radio set is substantially the same in Fig. 7 as it is in the construction illustrated in Figs. 1 to 6 inclusive. Instead of using the short bushing 21, however, I employ a much longer bushing 100 which extends completely through the arm 10, passing through the opening 20 in the partition 17 and also through an alined opening in the bottom wall of the arm 10. Above the pulley 22, the bushing 100 is provided with an annular flange 101 which serves the same purpose as the head 91 of the bushing 21.

In an upward direction, the bushing 100 extends axially beyond the upper end of the control knob 35 and supports the escutcheon plate 61 and a lamp-bulb socket 102 in which may be mounted the lamp bulb used to illuminate the dial 65. For the purpose of securing the escutcheon plate 61 to the bushing 100 it is provided with an elongated hub 103 adapted to be clamped between an annular flange 104 on the bushing 100 and a nut 105 screw-threadedly mounted on the upper end of the bushing.

Within the upper end of the bushing I mount a rotatable sleeve 106, the exterior surface of which intermediate its ends is reduced in diameter to leave at the lower end of the sleeve an annular flange 107 and at the upper end of the sleeve a head 108, both of which receive bearing support from the bushing 100. Withdrawal of the sleeve 106 from the bushing 100 is normally prevented by means of a screw 110 which extends through the wall of the bushing above the flange 107 and which may be availed of to mount a bracket 111 carrying the socket 102. To the upper end of the sleeve 106 is affixed a control knob 113, the connection between the control knob and the sleeve conveniently being effected by knurling the exterior surface of the sleeve and pressing it into the central opening in the knob. The lower surface of the knob 113 may have an axial recess for the reception of the nut 105 to improve the appearance of the device.

Centrally mounted in the sleeve 106 is a rotatable stem 114 held in place by a bushing 115 which is screw-threadedly received in the upper end of the sleeve 106. The upper end of the bushing 114 is counterbored and closed by a plate 116 having a central slot for the passage of the tang of a key 117. The lower end of the key extends into an axial slot 114' in the stem 114, so that the stem can be rotated by rotating the key. Preferably, the slot 114' has a width greater than the thickness of the key-tang, and in the spaces between the sides of the key-tang and the walls of the slot there are located the two legs of a U-shaped spring clip 118 which resiliently presses against the walls of the opening and also against the key to prevent rattling. The plate 116 is rotatable with the key 117 relatively to the bushing 115.

In the preferred arrangement, the stem 114 is utilized to control volume, while the sleeve 106 is utilized to effect tone-control. As previously indicated, an electrical unit used to provide tone control is directly associated with other electrical apparatus of the set, and is indicated at 82 in Fig. 8. The volume control unit 50 is also associated with other electrical apparatus and may be mounted closely adjacent the tone-control unit 82. The two control units 50 and 82 are connected respectively to the stem 114 and sleeve 106 by means of flexible shafts 120 and 121 enclosed respectively in sheaths 122 and 123.

The flexible shafts 120 and 121 may extend directly to the stem 114 and sleeve 106 respectively but preferably, for a purpose which will appear hereinafter, they terminate in connecting members 124 and 125 located in suitable bearing openings in the lower end of the bushing 100. Mating connecting members 126 and 127, which also receive bearing support from the lower end of the bushing 100, are connected respectively by flexible shafts 128 and 129 with the stem 114 and sleeve 106. The sheaths 122 and 123 are secured to the lower end of the bushing by means of set screws 130.

The flexible shafts 120, 121, 128, and 129 are conveniently a common form of flexible shaft comprised of two or more layers of oppositely wound helical wires. The upper end of the shaft 128 is affixed, as by soldering, in an axial opening in the lower end of the stem 114. The shaft 129 may pass through an opening in the flange 107 of the sleeve 106, and may be fastened therein as by soldering. Preferably, the shaft 129 extends upwardly beyond the flange 107 so that, in co-operation with the screw 110, it serves to prevent a complete rotation of the sleeve.

While the shafts 120 and 121 might, as indicated above, extend upwardly for direct connection to the stem 114 and sleeve 106, I prefer to employ the intermediate shafts 128 and 129 illustrated in Fig. 7 because they facilitate removal of the bushing 100 from the arm 10 and also because they enable the shafts 120 and 121 and the sheaths 122 and 123 to be supplied in such lengths as are required by any given installation.

Current for the lamp bulb mounted in the socket 111 may be supplied through a wire 131 which extends from the socket 111 through an opening 132 in the wall of the bushing 100 and then axially through the lower end of such bushing.

The Bowden-wire 29 and its casing 30 extend to a point adjacent a pulley 135 mounted on the end of the shaft 136 which carries the adjustable elements of the tuning condensers. The end of the casing 30 is stationarily supported, as by means of a clamp 137, while the Bowden-wire projects beyond the end of the casing 30 and is received in a circumferentially extending groove in the pulley 135. A torsion spring 138, acting between the pulley 135 and some convenient stationary part, tends to rotate the pulley 135 and shaft 136 in opposition to tension in the Bowden-wire 29.

The form of brake shown in Fig. 7 for opposing movement of the Bowden-wire 29 and rotation of the knob 35 under the influence of the torsion spring 138 is slightly different from that shown in Fig. 4. In Fig. 7, the partition 17 is shown as being provided with an annular series of upwardly opening pockets in each of which is located a coil compression spring 140. The upper ends of the springs 140 bear against a fibre washer 141 and force it into frictional engagement with the lower surface of the pulley 22.

The control unit illustrated in Figs. 7 to 9 can be set up and adjusted in the same way as that shown in Figs. 1 to 6. I may, however, eliminate the necessity for any relative angular adjustment between the knob 35 and pulley 22 by providing for relative angular adjustment of the dial 65 and the knob 35. In the construction illustrated in Figs. 4 and 6, the dial had only one position of adjustment relative to the knob 35; but, by providing the dial 65 with an annular series of notches 75 and the knob 35 with an annular series of correspondingly spaced bosses 76 adapted to receive such notches, provision is made for placing the dial in any of a number of different angular positions relative to the knob 35. As shown in Fig. 9, there are four of the notches 75, so that four positions of angular adjustment of the dial relative to the knob are possible. Conveniently, the dial 65 is provided around its edge with a downwardly extending annular flange 65' in which the notches 75 are formed.

In the construction illustrated in Figs. 7 and 9 the index which co-operates with the series of graduations on the dial 65 is shown as a pointed projection 147 in one wall of the dial-exposing opening 66 in the escutcheon plate. This eliminates the necessity for the plate 68 of translucent material which is shown in Fig. 6 and which bears an index in the form of a light-transmitting radial slot 67.

A washer 150 of felt or some similar material may be located between the escutcheon plate 61 and the dial 65 and surrounding the hub 103 of the escutcheon plate to prevent entrance of dust into the interior of the knob.

I claim as my invention:

1. In a remote control unit for a radio set, a base, a member rotatably supported from said base, said member having a radially outwardly directed annular flange near its lower end, a washer secured to said base and overlying said flange to prevent separation of the member and base, and a flexible element having one end secured to said member and partially encircling said member above said flange and in the plane of said washer, said washer having in its lower face a tangential groove through which said flexible element passes.

2. A remote control unit for an automobile radio set, comprising an arm adapted to be secured to the steering post of an automobile and to extend laterally therefrom, a drum rotatably mounted in said arm near the outer end thereof on an axis transverse to the arm and generally parallel to the steering post, a Bowden wire secured to said drum to be wrapped therearound as the drum is rotated, said Bowden wire extending from said drum and having its remote end adapted for connection to a movable element of the radio set, a member secured to said drum and rotatable therewith said member being provided with a circumferentially extending series of graduations and being angularly adjustable relative to said drum about the drum-axis, and an index carried by said arm and co-operating with said graduations.

3. A remote control unit for a radio set, comprising a base, a control knob rotatably mounted on said base and adapted for mechanical connection with movable parts of the radio set, said knob being cup-shaped and having its open end remote from said base, a stationary support secured to said base and projecting outwardly therefrom into said knob, a circular plate rigidly secured to said support and closing the open end of said knob, said plate being provided with an opening, and said knob being provided interiorly with a circumferentially extending scale visible through the said opening in said plate.

4. In a control unit for a radio set, two relatively rotatable co-axial control members, a rotatable shaft secured centrally to one of said control members, and a second rotatable shaft secured to the other of said control members, said second shaft being flexible and being secured to its associated control member at an eccentric point thereon.

5. A remote control unit for a radio set, comprising a base, a cup-shaped control knob rotatably mounted on said base and adapted for mechanical connection with an adjustable tuning unit in the radio set, the open end of said knob being remote from said base, a stationary support secured to said base and projecting outwardly therefrom into said knob toward the open end of said knob and through the opposite end thereof, and a control member for electrical apparatus, said control member being movably mounted in said support and being accessible for operation through the open end of said knob.

6. A control unit as set forth in claim 5 with the addition of a stationary plate closing the open end of said knob, said plate having an opening, the control member of said electrical apparatus being rotatable about an axis in alinement with said opening.

EARL C. BOOTH.